US011463878B1

(12) United States Patent
Lashley

(10) Patent No.: US 11,463,878 B1
(45) Date of Patent: Oct. 4, 2022

(54) METHODS, SYSTEMS AND COMPUTER PROGRAM PRODUCTS FOR PROCESSING UNWANTED TEXT MESSAGES

(71) Applicant: Bandwidth Inc., Raleigh, NC (US)

(72) Inventor: Stephanie Lashley, Prairie Village, KS (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 17/841,782

(22) Filed: Jun. 16, 2022

(51) Int. Cl.
*H04W 12/088* (2021.01)
*H04W 12/128* (2021.01)
*H04L 51/212* (2022.01)
*H04W 4/12* (2009.01)

(52) U.S. Cl.
CPC ......... *H04W 12/088* (2021.01); *H04L 51/212* (2022.05); *H04W 12/128* (2021.01); *H04W 4/12* (2013.01)

(58) Field of Classification Search
CPC ... H04W 12/088; H04W 12/128; H04W 4/12; H04W 12/06; H04W 12/062; H04W 12/065; H04W 12/068; H04W 12/069; H04W 12/08; H04W 12/082; H04W 12/084; H04W 12/086; H04W 12/12; H04W 12/121; H04W 12/122; H04W 12/125; H04W 12/126; H04W 88/02; H04W 4/14; H04L 51/212; H04L 63/08; H04L 51/58; H04M 1/72436
See application file for complete search history.

(56) References Cited

U.S. PATENT DOCUMENTS

2008/0114884 A1* 5/2008 Hewes .................. H04L 9/40
709/229

OTHER PUBLICATIONS

MiraMap: A We-Government Tool for Smart Peripheries in Smart Cities. IEEE access 5 (Year: 2015).*

* cited by examiner

*Primary Examiner* — Sharad Rampuria
(74) *Attorney, Agent, or Firm* — Gregory Stephens

(57) ABSTRACT

Some embodiments of the present inventive concept provide methods for processing unwanted text messages based on reporting of sending telephone in a telecommunications system. The method includes retrieving aggregated data associated with sending telephone numbers from a central repository accessible by a plurality of Carriers. The retrieved aggregated data is analyzed to identify sending telephone numbers that satisfy flagging criteria. The flagging criteria indicates a threat level associated with text messages sent from corresponding telephone numbers. Preventative and/or remedial action is implemented for each telephone number identified as satisfying flagging criteria. A severity of the preventative and/or remedial action is directly correlated with the threat level associated with the flagging criteria. Each of these sending telephone numbers is actively monitored. The severity of the preventative and/or remedial action is increased and/or decreased for each actively monitored sending telephone number periodically based on newly received reports.

30 Claims, 4 Drawing Sheets

METHODS, SYSTEMS AND COMPUTER PROGRAM PRODUCTS FOR PROCESSING UNWANTED TEXT MESSAGES

FIELD

The present inventive concept generally relates to telecommunications networks and, more particularly, to unwanted messages and processing thereof.

BACKGROUND

Telecommunication customers, for example, mobile subscribers, do not generally like to receive text messages also referred to as short message service (SMS) messages from unknown sources. Some of these unknown sources may actually be SPAM, i.e. unsolicited text messages that are generally sent to a large amount of people. Many Carriers, including, Verizon, AT&T, Sprint, and T-Mobile allow reporting of potential SPAM messages by forwarding these messages to "7726." 7726 is a dedicated short message service (SMS) short code that is used to report unwanted text messages to the Carrier associated with the mobile subscriber. A recipient need only forward the suspected SPAM or unwanted text message to 7726.

Reporting the unwanted text and associated originating (sending) telephone number to 7726 will not necessarily stop messages from being sent from the sending telephone number in the short term, but like reporting SPAM in an email application, reporting the unwanted text message will help filter the messages from this number in the future, if necessary. For example, 7726 complaints may be collected and aggregated at a Carrier network level and provided to, for example, the Carrier's intercarrier vendor (ICV) (e.g., Syniverse). This aggregated information may be used to make decisions about the treatment of the originating number. For example, if a threshold number of 7726 messages are received that reference the same originating number, calls from this number may be blocked. Improved processes for evaluating unwanted text messages reported using 7726 and the treatment thereof are desired.

SUMMARY

Some embodiments of the present inventive concept provide methods for processing unwanted text messages based on reporting of telephone numbers associated with the unwanted text messages in a telecommunications system. The method includes retrieving aggregated data associated with sending telephone numbers from a central repository accessible by a plurality of Carriers. The retrieved aggregated data includes sending telephone numbers associated with unwanted text messages reported utilizing a dedicated phone number for reporting unwanted text messages. The retrieved aggregated data is analyzed to identify sending telephone numbers that satisfy at least one of a plurality of flagging criteria. The plurality of flagging criteria indicate a threat level associated with text messages sent from corresponding telephone numbers. Preventative and/or remedial action is implemented for each telephone number identified as satisfying the at least one of a plurality of flagging criteria. Aa severity of the preventative and/or remedial action is directly correlated with the threat level associated with the at least one of the plurality of flagging criteria. Each of the sending telephone numbers that is a recipient of preventative and/or remedial action is actively monitored. The severity of the preventative and/or remedial action is increased and/or decreased for each actively monitored sending telephone number periodically based on newly received reports associated with each telephone number made utilizing the dedicated phone number for reporting unwanted text messages.

Related systems and computers are also provided.

DETAILED DESCRIPTION OF EMBODIMENTS

Figure 1:
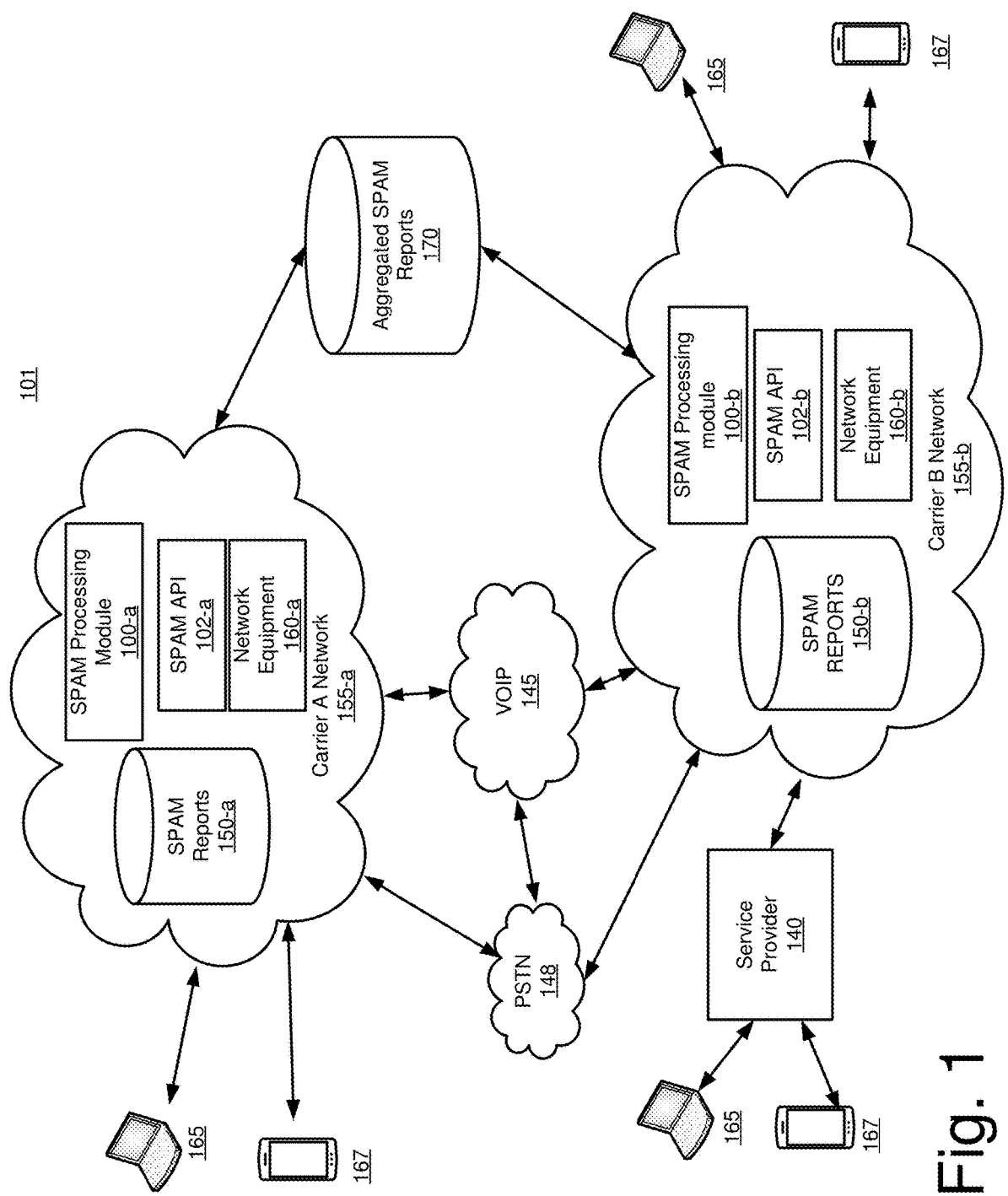
FIG. 1 is a block diagram illustrating a network including a SPAM processing module in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, a dedicated SMS code "7726" is provided for reporting unwanted text messages. The terms 'text message' and 'SMS message' may be used interchangeably herein. In addition, the inventive concepts described herein may also be applied to multi-media message(s) (MMS).

Currently, 7726 complaints are collected and aggregated at the Carrier network level and may be provided to the Carrier's intercarrier vendor (ICV). The ICV, also known as "hub providers," act as hubs to facilitate interoperability by transporting messaging traffic between multiple network operators. Currently, actions that can be taken by the Carrier when 7726 complaints are received may include, for example, creating a filter to monitor a number of complaints associated with a single sending telephone number and/or blocking the telephone number from being able to send text messages. The block of the sending telephone number may be temporary or permanent depending on the situation. The 7726 data can be shared directly by the Carrier or through the ICV with the content service provider (CSP) and/or a direct Carrier aggregator (DCA) who owns the telephone numbers. This data may be shared by email from the Carrier/ICV to the CSP/DCA via, for example, spreadsheet. However, this data is not currently shared among Carriers.

Accordingly, some embodiments of the present inventive concept provide a non-Carrier specific aggregated SPAM data repository that receives "7726" data from a plurality of Carriers. The aggregated data can be accessed by the Carriers, CSPs and/or DCAs for the purpose of reporting, analysis, download and taking meaningful action with downstream messaging customers, for example, education, increased proactive monitoring, filtering or blocking as will be discussed further herein with respect to the figures.

Referring now to FIG. 1, a block diagram illustrating an example system 101 according to some embodiments of the present inventive concept will be discussed. As illustrated, the system 101 includes a voice over internet protocol (VoIP) network 145; a public switched telephone network (PSTN) 148; a plurality of Carrier networks, for example, Carrier A Network 155-a and Carrier B Network 155-b; a service provider 140 and a plurality of endpoints 165 and 167 in communication with the Carrier Networks 155-a and 155-b and the service provider 140; and an aggregated SPAM reports repository 170 accessible by the plurality of Carriers in accordance with some embodiments discussed herein. Although only two Carriers are illustrated in FIG. 1, it will be understood that one Carrier or more than two Carriers may be present in the system without departing from the scope of the present inventive concept. Similarly, only a single aggregated SPAM reports repository 170 is shown in FIG. 1, however, more than one may be provided without departing from the scope of the present inventive concept.

The VoIP network 145 is provided by a group of technologies and is a method for the delivery of voice communications, data, and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the PSTN. The PSTN network 148 is an aggregate of the world's circuit-switched telephone networks that are operated by national, regional, or local telephony operators, providing infrastructure and services for public telecommunication. The network 145 may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless wide area network (WAN), wireless network (e.g., 802.11 WiFi), cellular network, and other communications networks.

The plurality of endpoints may include an internet of things (IoT) endpoint 165 and/or a telephony endpoint 167. The IoT endpoint may include an end user device such as a personal computer (PC), security system or component, heating, ventilation, and air conditioning (HVAC) system or component, automotive device, audio device, smart refrigerator, smart stove, smart television, and the like. The telephony endpoint 167 may be a mobile device such as cell phone, smartphone, laptop, VoIP phone, IoT device, or another telephonic device. The endpoints 165 and 167 communicate through the networks 145 and 148 and the Carriers 155-a and 155-b.

As used herein, the term a "telecommunications Carrier" may refer to any provider of telecommunications services. FIG. 1 also includes a service provider 140. It will be understood that a Carrier, such as Carrier A and B in FIG. 1 may be a service provider, for example, Bandwidth, Verizon, AT&T and the like. However, the reverse is not true, a service provider 140 is not necessarily a Carrier. In embodiments where the service provider 140 is not a Carrier, the service provider 140 may be a customer of the Carrier. FIG. 1 illustrates, the service provider 140 being a customer of Carrier B 155-b. It will be understood that although the service provider 140 is shown as only being a customer of Carrier B 155-b, embodiments of the present inventive concept are not limited thereto. The service provider 140 may be customer of other Carriers or there may be additional service providers in the system 101 without departing from the scope of the present inventive concept.

As further illustrated in FIG. 1, each Carrier Network 155-a and 155-b may include SPAM Reports 150-a and 150-b; network equipment 160-a and 160-b; a SPAM processing module 100-a and 100-b and a SPAM API 102-a and 102-b, respectively, in accordance with embodiments discussed herein. Although not shown in FIG. 1, the SPAM Reports, SPAM processing module and SPAM API may also be present in other elements of the system 101. For example, these elements may be present at a direct Carrier aggregator (DCA) or a content service provider (CSP) and the like without departing from the scope of the present inventive concept. The network equipment 160-a and 160-b may illustrate any hardware used to send, receive, and route calls at the Carrier Network 155-a and 155-b.

The SPAM processing module 100-a and 100-b may provide methods, systems and computer program products for processing unwanted text messages utilizing aggregated SPAM reports 170 from a plurality of Carriers, not just the Carrier associated with the SPAM processing module 100-a and 100-b. Processing of the SPAM reports by the SPAM processing module allows the Carrier 155-a and 155-b, the CSP and/or the DCA to take preventative and/or remedial action based on the processing results as will be discussed below. The SPAM API 102-a and 102-b may allow data transmission from a Carrier or ICV to CSP and/or DCA in some embodiments. Furthermore, the API may be integrated in a dashboard so that users can view the 7726 data associated with their sending telephone numbers and take action themselves to reduce the likelihood that their sending numbers will be blocked or have other remedial action taken with respect thereto.

Figure 2:
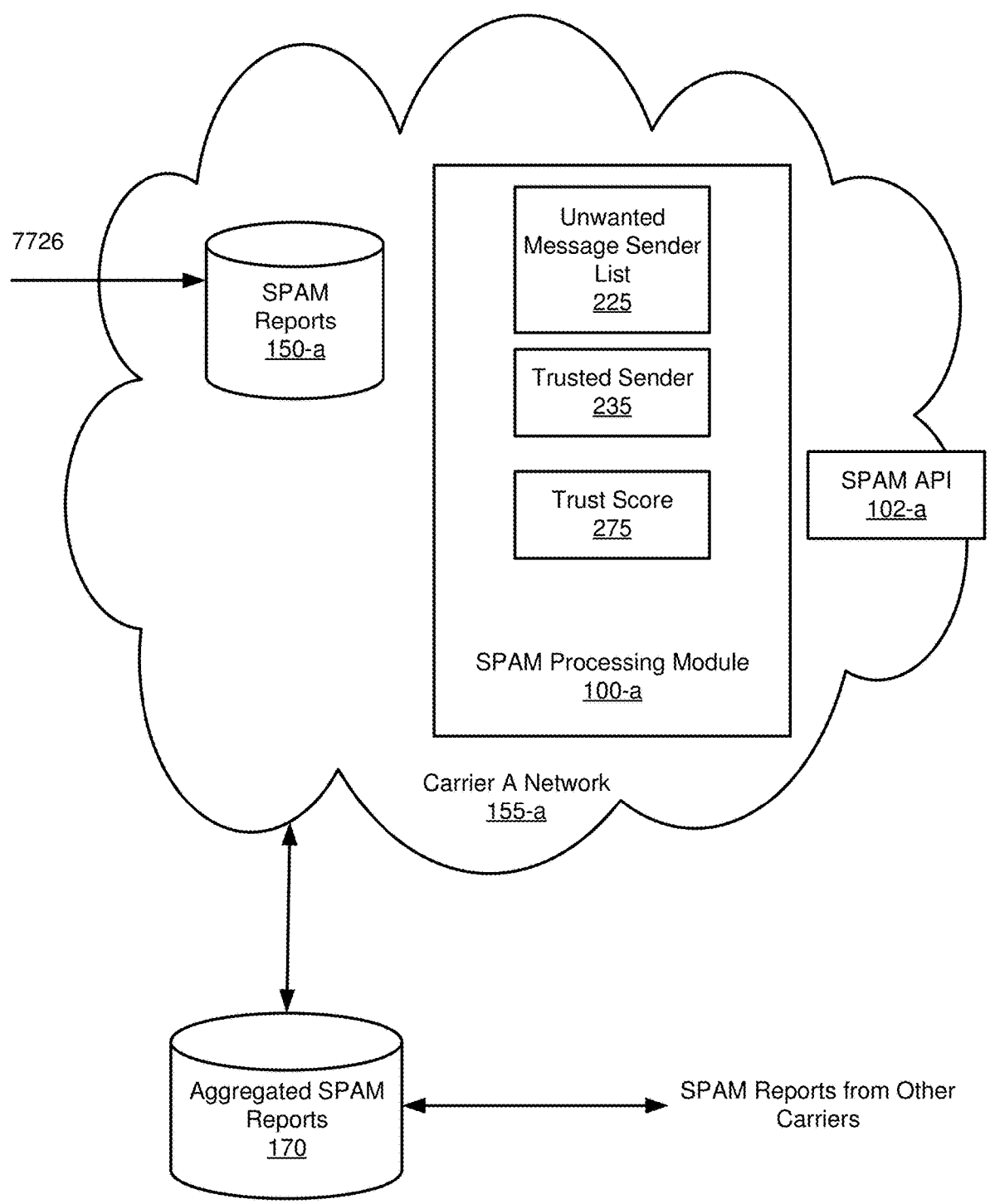
FIG. 2 is a block diagram illustrating details associated with the SPAM processing module in accordance with some embodiments of the present inventive concept.

FIG. 2 is a more detailed block diagram of the SPAM Processing Module 100-a in communication with the Aggregated SPAM Reports Repository 170 in accordance with some embodiments of the present inventive concept. Operations in accordance with some embodiments of the present inventive concept will now be discussed with respect to FIGS. 1 and 2.

As illustrated in FIG. 2, when a mobile subscriber receives an unwanted text message, the mobile subscriber can send the unwanted text message to a dedicated phone number that is used solely for reporting unwanted text messages. Embodiments discussed herein reference a dedicated four digit short message service (SMS) short code, 7726, as being the dedicated phone number for reporting. However, embodiments of the present inventive concept are not limited thereto. Any dedicated number could be used for reporting without departing from the present inventive concept.

It will be understood that an "unwanted text message" is not necessarily SPAM. Some legitimate text messages sent from legitimate sources could be "unwanted" by the mobile subscriber. For example, political text messages are sent frequently during campaign season. These text messages are not SPAM, but are often unwanted or unwelcome. Thus, reporting these text messages to "7726" will not automatically block all text messages coming from this source. However, the reporting to 7726 is a data point that helps Carriers to determine if and when to implement preventative and/or remedial action with respect to the reported source as will be discussed further herein.

Referring again, as illustrated, the 7726 message is sent to the Carrier and the Carrier stores the 7726 report in the Spam Reports database 150-a. This information may be shared with the aggregated SPAM reports repository 170. This repository 170 receives 7726 reports from more than one Carrier, allowing all Carriers access to 7726 data of all other Carriers. This aggregated data can be analyzed to determine how a particular sending telephone number should be treated responsive to the 7726 reporting.

In particular, the SPAM processing module 100-a retrieves the aggregated data associated with sending telephone numbers from the central aggregated SPAM repository 170 that is accessible by a plurality of Carriers. Among other things, the retrieved aggregated data includes sending telephone numbers associated with unwanted text messages reported utilizing a dedicated phone number for reporting unwanted text messages, i.e. 7726. The retrieved aggregated data is analyzed to identify telephone numbers that satisfy at least one of a plurality of flagging criteria. In other words, some embodiments provide threshold number of reports associated with a single sending number that translate into a "threat level" or unwantedness of the sending number. For example, if a sending number is only reported two times from all Carriers, this number is likely not posing much of a problem. However, if a sending number is reported 100 times, 500 times, 1000 times, etc. each of these threshold levels may be indicative of different threat levels or levels of unwantedness. Thus, each time a sending number exceeds a new threshold, it is considered to have satisfied a "flagging criteria." In other words, the sending number has been reported enough to be flagged as a potential problem. Each flagging criteria indicates a different threat level and, therefore, triggers a different preventative and/or remedial action that may be taken for sending telephone numbers at each level.

The various threat levels can be categorized using any known differentiating element. For example, colors may be used to identify threat levels. A "red" threat may indicate that the threat is extremely bad, a "green" threat may indicate that the threat is mostly non-existent and the colors in between may be defined as needed. Other differentiating elements, such as numbers and shapes, may be used without departing from the scope of the present inventive concept. For example, a threat level of "1" may be urgent, but a threat level of "10" may be less so. These thresholds and related threat levels are customizable by the user.

Examples of preventative and/or remedial action may include, but are not limited to, reporting feedback to users that text messages from telephone numbers associated with the users have been reported; monitoring specific reported telephone numbers based on threshold amounts of reports associated therewith; filtering text messages associated with specific telephone numbers based on the threat level associated therewith; assigning identities to specific telephone numbers indicative of threat levels associated with therewith; assigning specific telephone numbers a status of "trusted sender" based on lack of reports associated therewith; and/or blocking text messages sent from specific telephone number at one or more Carriers.

A severity of the preventative and/or remedial action can be directly correlated with the threat level. For example, if the threat level is "RED", the action may be to block all text messages from the number, either temporarily or permanently. But a lower level threat, may only call for monitoring or contacting the text message sender to adjust content of the text messages so that the text messages no longer get flagged in the future. In some embodiments, a system wide industry standard for 7726 complaint thresholds may be developed and provided to promote uniformity.

Once the reported sending telephone numbers have a preventative and/or remedial action applied thereto, the reported sending telephone numbers may be monitored to determine if any adjustments need to be made to the applied action based on new data being reported with respect to the sending telephone number. In other words, the severity of the preventative and/or remedial action for each actively monitored phone number may be increased or decreased periodically based on newly received reports as the aggregated SPAM repository is constantly updated by a plurality of Carriers. In some embodiments, the severity of the preventative and/or remedial action for each actively monitored phone number may be automatically increased or decreased as will be discussed further below.

For example, a sending telephone number with very few 7726 reports may not be blocked, but monitored for bad behavior. However, if the number of reports for this sending telephone number increases significantly over time, the severity of the action may be increased to temporarily blocking the sending telephone number. Furthermore, monitoring a blocked number is also important as the sending telephone number may be reassigned to a new owner that has not done anything to be blocked. In some embodiments, the reported sending telephone numbers may be monitored automatically and action may be taken responsive thereto as will be discussed further below.

To facilitate the processing of the 7726 reported sending telephone numbers, some embodiments of the present inventive concept generate and maintain an "unwanted sender list" 225 as shown in FIG. 2. The unwanted sender list 225 is generated using data from the aggregated SPAM repository 170. This unwanted sender list 225 may include information related to sending telephone numbers that have been reported using the 7726 SMS code. For example, the unwanted sender list 225 may include a list of sending telephone numbers reported, a number of times each of these sending telephone numbers has been reported, the threat level associated with the sending telephone number, any action that has been taken with respect the sending telephone number and the like. It will be understood that any information may be included in the unwanted sender list 225 and, therefore, is not limited to the examples provided herein.

In some embodiments, if it is determined that one or more telephone numbers included on the unwanted sender list 225 has a very low threat level based on the satisfied flagging criteria, feedback may be provided to senders associated with the one or more telephone numbers to allow senders an opportunity to address issues with text messages originating from the one or more telephone numbers before the severity of the preventative and/or remedial action associated with the one or more numbers is increased.

In some embodiments of the present inventive concept, the sending telephone number may be assigned an "identity." This identity may also be included in the unwanted sender list 225. Assigning an identity to the sending telephone number may allow a lifecycle of the sending telephone number to be tracked. In other words, if the sender associated with the sending telephone number is "Sam" at one point in time, but then becomes "Alex," it can be assumed that the data associated with sending telephone number when "Sam" was the identity is no longer valid. Qualifications may also be assigned to the sending telephone number. For example, the sender may be indicated as a good sender, a bad sender, a known sender, an unknown sender, a T-Mobile 7726 offender, an AT&T 7726 offender, a Verizon 7726 offender and the like. This information may also be included in the unwanted sender list 225. It will be understood that the more information there is associated with the reporting sending telephone number, the more accurate the preventative or remedial action will be.

It will be understood that the 7726 reports may not only be used to stop bad actors but can also be used to create an elevated class of senders if no 7726 reports have been issued with respect thereto. For example, as illustrated in FIG. 2, some embodiments of the present inventive concept may designate one or more sending telephone numbers as "trusted senders" 235. When a sending telephone number is designated a "trusted sender," the sending telephone number may be given advantages and privileges over other senders in the network. An industry wide understanding of the term "trusted sender" may be established so this send may experience the assigned privileges in any network. Various criteria may be created to designate a sender as a "trusted sender." For example, trust may be based on whether the sender telephone number has any violations associated therewith; a length of time the sender has been in business; a length of time the sender has owned or leased the sending telephone number; a length of time the sender has been sending text messages to customers; a ratio of good traffic versus bad traffic and the like. This list is provided as example only and thus more items may be added or items may be removed without departing from the scope of the present inventive concept.

The trusted sender criteria may be used to determine an overall trustworthiness of the sender, which may be represented by a trust score 275. The trust score 275 of the trusted sender may dictate messaging throughput and deliverability. In other words, the better your trust score 275, the better your quality of service. In some embodiments, the trusted senders/trust scores may be made available to all elements of the network.

Some embodiments of the present inventive concept may further provide creation of and access to a Global Opt-out database, creation of an access to a Do Not Message List and the like. Thus, embodiments of the present inventive concept may collect and utilize data to create more tools to more effectively and proactively manage messages.

As further discussed above and illustrated in FIG. 2, some embodiments of the present inventive concept provide a SPAM API 102-*a*. The SPAM API 102-*a* may facilitate data transmission from the Carrier or ICV to a CSP or DCA. Furthermore, in some embodiments the API may be integrated into a Dashboard provided by the Carrier so that users can see their 7726 data and possibly take preventative action. In other words, users are given access to user specific data on the unwanted sender list 225 to allow users to view sending telephone numbers that have been reported and implement remedial actions associated messages from the sending telephone numbers.

Figure 3:
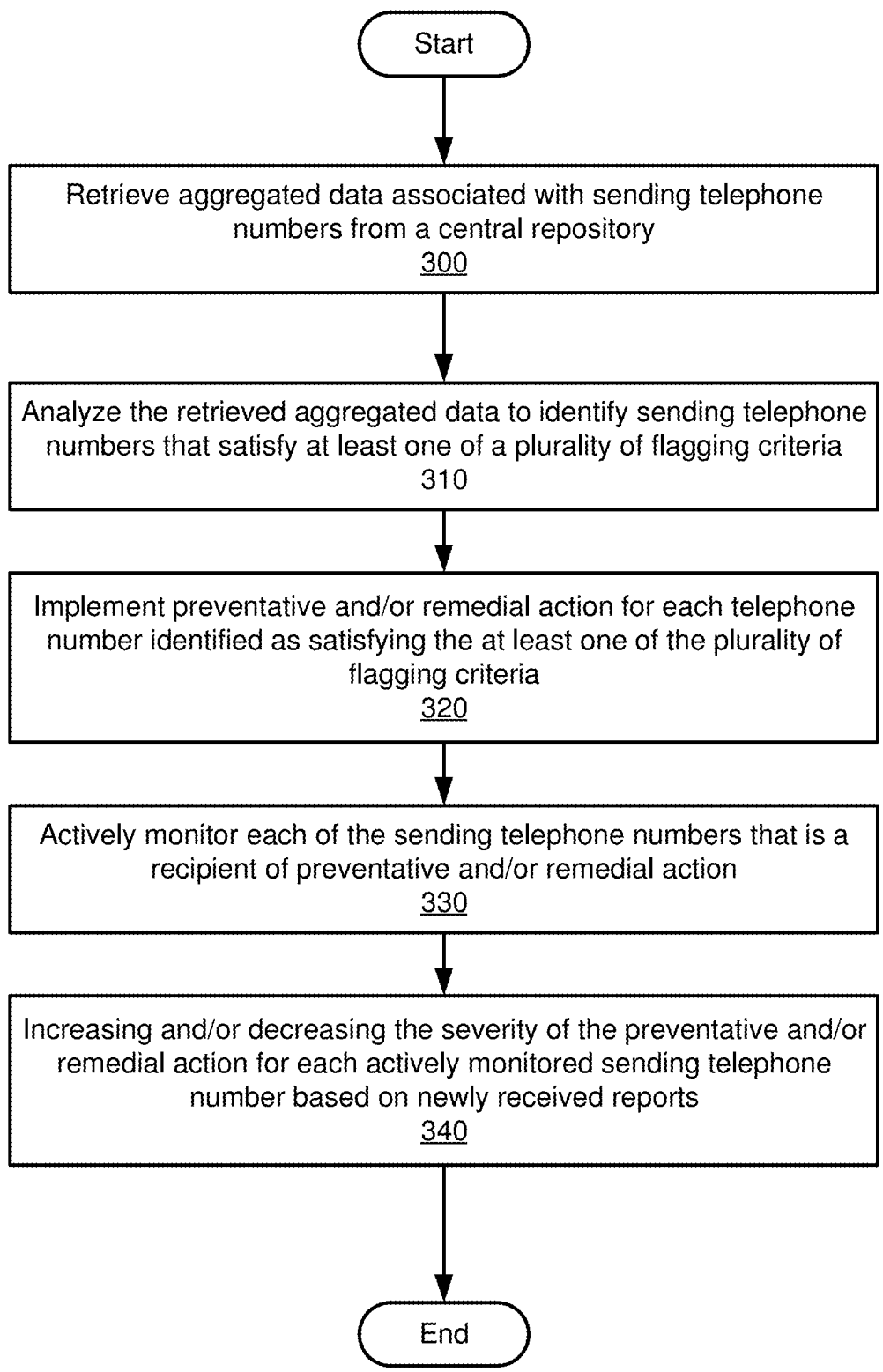
FIG. 3 is a flowchart illustrating operations for processing unwanted text messages from reported sending numbers in accordance with some embodiments of the present inventive concept.

Referring now to the flowchart of FIG. 3, methods for processing unwanted text messages based on reporting of sending telephone numbers associated with the unwanted text messages in a telecommunications system will be discussed. As illustrated in FIG. 3, operations begin at block 300 by retrieving aggregated data associated with sending telephone numbers from a central repository accessible by a plurality of Carriers. The retrieved aggregated data includes, for example, sending telephone numbers associated with unwanted messages reported utilizing a dedicated phone number for reporting unwanted text messages, i.e. 7726.

The retrieved aggregated data is analyzed to identify sending telephone numbers that satisfy at least one of a plurality of flagging criteria (block 310). As discussed above, the flagging criteria are thresholds, each indicative a different threat level. The various possibilities are discussed above. The plurality of flagging criteria indicate a threat level associated with text messages sent from corresponding telephone numbers.

Preventative and/or remedial action is implemented for each telephone number identified as satisfying the at least one of a plurality of flagging criteria (block 320). Thus, if the sending telephone number is reported a number of times that exceeds any of the specified thresholds, an action will be taken. A severity of the preventative and/or remedial action may be directly correlated with the threat level associated with the at least one of the plurality of flagging criteria.

Each of the sending telephone numbers that is a recipient of preventative and/or remedial action may be actively monitored (block 330). In other words, once an action has been taken, a threat level of a sending telephone number may be moved up or down in severity based on what happens with the sending telephone number in the future. Thus, the severity of the preventative and/or remedial action for each actively monitored sending telephone number may be increased or decreased periodically based on newly received reports associated with each telephone number made utilizing the dedicated phone number for reporting unwanted text messages (block 340). In some embodiments, the increasing and/or decreasing the severity of the preventative and/or remedial action may be performed automatically for each actively monitored phone number based on updated aggravated data at the central repository.

In some embodiments, analyzing the retrieved aggregated data may include creating an unwanted sender list 225 may be created based on the aggregated data at the central repository. The unwanted sender list 225 may include, for example, a list of sending telephone numbers, a number of times each of these sending telephone numbers has been reported and the flagging criteria associated with each of the telephone numbers.

The data in the aggregated data at the central repository is continually updated with sending telephone numbers reported to one of a plurality of Carriers utilizing a dedicated phone number for reporting unwanted text messages.

An example of a preventative action may be when it is determined that one or more telephone numbers included on the unwanted sender list 225 has a very low threat level based on the satisfied flagging criteria, feedback may be provided to senders associated with the one or more telephone numbers to allow senders an opportunity to address issues with text messages originating from the one or more telephone numbers before the severity of the preventative and/or remedial action associated with the one or more numbers is increased.

Furthermore, in some embodiments, users/customers may be provided access to user specific data on the unwanted sender list to allow users to view sending telephone numbers that have been reported and implement remedial actions associated messages from the sending telephone numbers.

As discussed above, in some embodiments, actions of the SPAM module including, for example, increasing and/or decreasing the severity of the preventative and/or remedial action for each actively monitored phone number may be automatically performed. In particular, the SPAM module may implement certain machine learning techniques that are configured to identify thresholds and patterns within the sending telephone number data reported using 7726, such as a number of reports for a given sending telephone number, expiration of a life of a sending telephone number, significant reduction of a number of complaints for a specific sending telephone number and the like. The SPAM module may identify these thresholds and/or patterns in the data related to the reported sending telephone numbers using program code executable by one or more processors, for example, the data processing system 430 of FIG. 4. While some of the discussion herein is with reference to analysis of reported sending telephone number data, such discussions should be interpreted to also cover analysis of any other type of data, such as any data related to managing unwanted text messages.

In some embodiments, the SPAM module includes a machine learning component/module 403 (FIG. 4) that can be used to assist in, for example, detection of threat level posed by unwanted text messages. For example, the machine learning component can implement machine learning algorithms or artificial intelligence (AI) to generate and/or update neural networks that are executed by a processor. In some embodiments, the machine learning component can use one or more machine learning algorithms to generate one or more models or parameter functions for the detections. The machine learning component can be configured to generate an event model that understands which types of data indicate which types of detections. One or more of these event models may be used to determine an expected value or occurrence based on analysis of received data. In some embodiments, criteria (e.g., thresholds related to threat levels) can be designated by a user, admin, or automatically. For example, the threshold criteria can indicate which types of unwanted text messages to monitor, analyze and/or block. By designating specific types of detections, resources (e.g., processing power, bandwidth, etc.) can be preserved for only the types of detections desired.

Various types of algorithms may be used by the machine learning component to generate the output desired. For example, certain embodiments herein may use a logistical regression model, decision trees, random forests, convolutional neural networks, deep networks, or others. However, other event detection models are possible, such as a linear regression model, a discrete choice model, or a generalized linear model. The machine learning algorithms can be configured to adaptively develop and update the event detection models over time based on new input received by the machine learning component. For example, as discussed above, as new data is received, i.e. unwanted text messages are reported using 7726, the event detection models may be regenerated on a periodic basis as this newly received data is available to help keep the predictions in the event detection model more accurate as the data is collected over time. Also, for example, the event detection models may be regenerated based on configurations received from a user or management device.

Some non-limiting examples of machine learning algorithms that can be used to generate and update event detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, copious amounts (such as terabytes or petabytes) of received data may be analyzed to generate models without manual analysis or review by one or more people.

Figure 4:
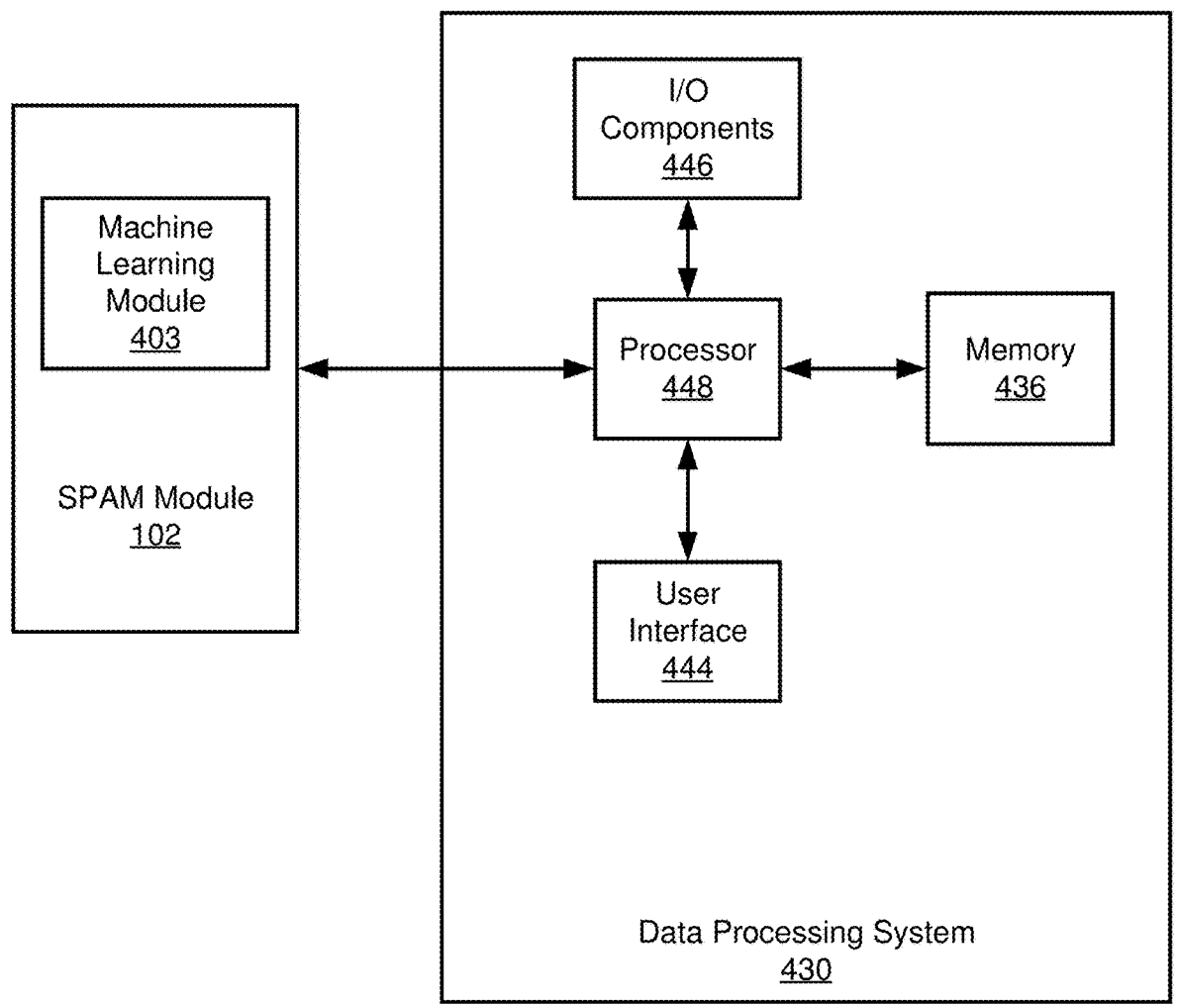
FIG. 4 is a block diagram of a data processing system for use in accordance with some embodiments of the present inventive concept.

Referring now to FIG. 4, an example of a data processing system 430 suitable for use with any of the examples described above. Although the example data processing system 430 is shown as in communication with the SPAM module 102 including a machine learning module 430 in accordance with embodiments of the present inventive concept, the data processing system 430 may also be part of the SPAM module 102 or in any other component of the system 101 without departing from the scope of the present inventive concept. In some examples, the data processing system 430 can be any suitable computing device for performing operations according to the embodiments discussed herein.

As illustrated, the data processing system 430 includes a processor 448 communicatively coupled to I/O components 446, a user interface 444 and a memory 436. The processor 448 can include one or more commercially available processors, embedded processors, secure processors, microprocessors, dual microprocessors, multi-core processors, other multi-processor architectures, another suitable processing device, or any combination of these. The memory 436, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 430.

I/O components 446 may be used to facilitate wired or wireless connections to devices such as one or more displays, game controllers, keyboards, mice, joysticks, cameras, buttons, speakers, microphones and/or other hardware used to input or output data. Memory 1036 represents nonvolatile storages such as magnetic, optical, or other storage media included in the data processing system and/or coupled to processor 448.

The user interface 444 may include, for example, a keyboard, keypad, touchpad, voice activation circuit, display or the like and the processor 448 may execute program code or instructions stored in memory 436.

It should be appreciated that data processing system 430 may also include additional processors, additional storage, and a computer-readable medium (not shown). The processor(s) 448 may execute additional computer-executable program instructions stored in memory 436. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As briefly discussed above with respect to FIGS. 1 through 4, some embodiments of the present inventive concept provide methods for determining a root cause of a detected anomalous event in a telecommunications system. In further embodiments, an analysis of whether the detected event is a "true positive" may be performed before the root cause analysis is completed.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core 5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A method for processing unwanted text messages based on reporting of telephone numbers associated with the unwanted text messages in a telecommunications system, the method comprising:
   retrieving aggregated data associated with sending telephone numbers from a central repository accessible by a plurality of Carriers, the retrieved aggregated data including sending telephone numbers associated with unwanted text messages reported utilizing a dedicated phone number for reporting unwanted text messages;
   analyzing the retrieved aggregated data to identify sending telephone numbers that satisfy at least one of a plurality of flagging criteria, the plurality of flagging criteria corresponding to threshold values of how many times a sending telephone number has been associated with an unwanted text message, the plurality of flagging criteria indicating a threat level associated with text messages sent from sending telephone numbers;
   implementing preventative and/or remedial action for each sending telephone number identified as satisfying the at least one of a plurality of flagging criteria, a severity of the preventative and/or remedial action being directly correlated with the threat level associated with the at least one of the plurality of flagging criteria;
   actively monitoring each of the sending telephone numbers that is a recipient of preventative and/or remedial action; and
   increasing and/or decreasing the severity of the preventative and/or remedial action for each actively monitored sending telephone number periodically based on newly received reports associated with each sending telephone number made utilizing the dedicated phone number for reporting unwanted text messages.

2. The method of claim 1, further comprising creating an unwanted sender list based on the aggregated data at the central repository, the unwanted sender list including at least a list of sending telephone numbers, a number of times each of these sending telephone numbers has been reported and the flagging criteria associated with each of the sending telephone numbers.

3. The method of claim 2, further comprising continually updating the aggregated data at the central repository with sending telephone numbers reported to one of a plurality of Carriers utilizing a dedicated phone number for reporting unwanted text messages.

4. The method of claim 3, further comprising automatically increasing and/or decreasing the severity of the preventative and/or remedial action for each actively monitored sending phone number periodically based on updated aggregated data at the central repository.

5. The method of claim 2 further comprising:
   determining that one or more telephone numbers included on the unwanted sender list has a very low threat level based on the satisfied flagging criteria; and
   providing feedback to senders associated with the one or more telephone numbers to allow senders an opportunity to address issues with text messages originating from the one or more telephone numbers before the severity of the preventative and/or remedial action associated with the one or more numbers is increased.

6. The method of claim 2, further comprising providing users access to user specific data on the unwanted sender list to allow users to view sending telephone numbers that have been reported and implement remedial actions associated messages from the sending telephone numbers.

7. The method of claim 1, wherein the dedicated phone number for reporting unwanted text messages comprises a short message service (SMS) short code.

8. The method of claim 1, wherein the preventative and/or remedial action comprises:
   reporting feedback to users that text messages from telephone numbers associated with the users have been reported;
   monitoring specific reported sending telephone numbers based on threshold amounts of reports associated therewith;
   filtering text messages associated with specific sending telephone numbers based on the threat level associated therewith;
   assigning identities to specific sending telephone numbers indicative of threat levels associated with therewith;
   assigning specific sending telephone numbers a status of "trusted sender" based on lack of reports associated therewith; and/or
   blocking text messages sent from specific sending telephone number at one or more Carriers.

9. The method of claim 8, wherein the trusted sender status is assigned based on history of violations associated with the sending telephone number; a length of time the sender associated with the sending telephone number has been in business; length of time the sender has owned or leased the sending telephone number; length of time the sender has been sending text messages to customers; and/or a ratio of good traffic to bad traffic.

10. The method of claim 9, further comprising assigning the trusted sender a trust score, the trust score dictating messaging throughput and deliverability of text messages associated with the trusted sender.

11. A system for processing unwanted text messages based on reporting of telephone numbers associated with the unwanted text messages in a telecommunications system, the system comprising:
   a processor, and a non-transitory computer readable medium to store a set of instructions for execution by the processor, the set of instructions to cause the processor to:

retrieve aggregated data associated with sending telephone numbers from a central repository accessible by a plurality of Carriers, the retrieved aggregated data including sending telephone numbers associated with unwanted text messages reported utilizing a dedicated phone number for reporting unwanted text messages;

analyze the retrieved aggregated data to identify sending telephone numbers that satisfy at least one of a plurality of flagging criteria, the plurality of flagging criteria corresponding to threshold values of how many times a sending telephone number has been associated with an unwanted text message, the plurality of flagging criteria indicating a threat level associated with text messages sent from sending telephone numbers;

implement preventative and/or remedial action for each sending telephone number identified as satisfying the at least one of a plurality of flagging criteria, a severity of the preventative and/or remedial action being directly correlated with the threat level associated with the at least one of the plurality of flagging criteria;

actively monitor each of the sending telephone numbers that is a recipient of preventative and/or remedial action; and increase and/or decrease the severity of the preventative and/or remedial action for each actively monitored sending telephone number periodically based on newly received reports associated with each sending telephone number made utilizing the dedicated phone number for reporting unwanted text messages.

12. The system of claim 11, further comprising a set of instructions to cause the processor to create an unwanted sender list based on the aggregated data at the central repository, the unwanted sender list including at least a list of sending telephone numbers, a number of times each of these sending telephone numbers has been reported and the flagging criteria associated with each of the sending telephone numbers.

13. The system of claim 12, further comprising a set of instructions to cause the processor to continually update the aggregated data at the central repository with sending telephone numbers reported to one of a plurality of Carriers utilizing a dedicated phone number for reporting unwanted text messages.

14. The system of claim 13, further comprising a set of instructions to cause the processor to automatically increase and/or decrease the severity of the preventative and/or remedial action for each actively monitored sending phone number periodically based on updated aggregated data at the central repository.

15. The system of claim 12, further comprising a set of instructions to cause the processor to:

determine that one or more telephone numbers included on the unwanted sender list has a very low threat level based on the satisfied flagging criteria; and provide feedback to senders associated with the one or more telephone numbers to allow senders an opportunity to address issues with text messages originating from the one or more telephone numbers before the severity of the preventative and/or remedial action associated with the one or more numbers is increased.

16. The system of claim 12, further comprising a set of instructions that cause the processor to provide users access to user specific data on the unwanted sender list to allow users to view sending telephone numbers that have been reported and implement remedial actions associated text messages from the sending telephone numbers.

17. The system of claim 11, wherein the dedicated phone number for reporting unwanted text messages comprises a short message service (SMS) short code.

18. The system of claim 11, wherein the preventative and/or remedial action comprises:

reporting feedback to users that text messages from telephone numbers associated with the users have been reported;

monitoring specific reported sending telephone numbers based on threshold amounts of reports associated therewith;

filtering text messages associated with specific sending telephone numbers based on the threat level associated therewith;

assigning identities to specific sending telephone numbers indicative of threat levels associated with therewith;

assigning specific sending telephone numbers a status of "trusted sender" based on lack of reports associated therewith; and/or blocking text messages sent from specific sending telephone number at one or more Carriers.

19. The system of claim 18, wherein the trusted sender status is assigned based on history of violations associated with the sending telephone number; a length of time the sender associated with the sending telephone number has been in business; length of time the sender has owned or leased the sending telephone number; length of time the sender has been sending text messages to customers; and/or a ratio of good traffic to bad traffic.

20. The system of claim 19, further comprising a set of instructions that cause a processor to assign the trusted sender a trust score, the trust score dictating messaging throughput and deliverability of text messages associated with the trusted sender.

21. A computer for processing unwanted text messages based on reporting of telephone numbers associated with the unwanted messages in a telecommunications system, the computer comprising:

one or more memories;

one or more processors, communicatively coupled to the one or more memories, the one or more processors configured to:

retrieve aggregated data associated with sending telephone numbers from a central repository accessible by a plurality of Carriers, the retrieved aggregated data including sending telephone numbers associated with unwanted text messages reported utilizing a dedicated phone number for reporting unwanted text messages;

analyze the retrieved aggregated data to identify sending telephone numbers that satisfy at least one of a plurality of flagging criteria, the plurality of flagging criteria corresponding to threshold values of how many times a sending telephone number has been associated with an unwanted text message, the plurality of flagging criteria indicating a threat level associated with text messages sent from sending telephone numbers;

implement preventative and/or remedial action for each sending telephone number identified as satisfying the at least one of a plurality of flagging criteria, a severity of the preventative and/or remedial action being directly correlated with the threat level associated with the at least one of the plurality of flagging criteria;

actively monitor each of the sending telephone numbers that is a recipient of preventative and/or remedial action; and increase and/or decrease the severity of the preventative and/or remedial action for each actively monitored sending telephone number periodically based on newly received reports associated with each sending telephone number made utilizing the dedicated phone number for reporting unwanted text messages.

22. The computer of claim 21, further comprising the one or more processors configured to create an unwanted sender list based on the aggregated data at the central repository, the unwanted sender list including at least a list of sending telephone numbers, a number of times each of these sending telephone numbers has been reported and the flagging criteria associated with each of the sending telephone numbers.

23. The computer of claim 22, further comprising the one or more processors configured to continually update the aggregated data at the central repository with sending telephone numbers reported to one of a plurality of Carriers utilizing a dedicated phone number for reporting unwanted text messages.

24. The computer of claim 23, further comprising the one or more processors configured to automatically increase and/or decrease the severity of the preventative and/or remedial action for each actively monitored sending phone number periodically based on updated aggregated data at the central repository.

25. The computer of claim 22, further comprising the one or more processors configured to:

determine that one or more telephone numbers included on the unwanted sender list has a very low threat level based on the satisfied flagging criteria; and provide feedback to senders associated with the one or more telephone numbers to allow senders an opportunity to address issues with text messages originating from the one or more telephone numbers before the severity of the preventative and/or remedial action associated with the one or more numbers is increased.

26. The computer of claim 22, further comprising the one or more processors configured to provide users access to user specific data on the unwanted sender list to allow users to view sending telephone numbers that have been reported and implement remedial actions associated text messages from the sending telephone numbers.

27. The computer of claim 21, wherein the dedicated phone number for reporting unwanted text messages comprises a short message service (SMS) short code.

28. The computer of claim 21, wherein the preventative and/or remedial action comprises:

reporting feedback to users that text messages from telephone numbers associated with the users have been reported;

monitoring specific reported sending telephone numbers based on threshold amounts of reports associated therewith;

filtering messages associated with specific sending telephone numbers based on the threat level associated therewith;

assigning identities to specific sending telephone numbers indicative of threat levels associated with therewith;

assigning specific sending telephone numbers a status of "trusted sender" based on lack of reports associated therewith; and/or blocking text messages sent from specific sending telephone number at one or more Carriers.

29. The computer of claim 28, wherein the trusted sender status is assigned based on history of violations associated with the sending telephone number; a length of time the sender associated with the sending telephone number has been in business; length of time the sender has owned or leased the sending telephone number; length of time the sender has been sending text messages to customers; and/or a ratio of good traffic to bad traffic.

30. The computer of claim 29, further comprising the one or more processors configured to assign the trusted sender a trust score, the trust score dictating messaging throughput and deliverability of text messages associated with the trusted sender.

* * * * *